Fig. 1

Aug. 31, 1948.   C. T. GALLOWAY   2,448,426
GEAR CUTTING MACHINE
Filed Feb. 18, 1944   8 Sheets-Sheet 2

Fig. 2

Inventor
CLARENCE T. GALLOWAY
By
M. E. Ashlinger
Attorney

Aug. 31, 1948.　　　C. T. GALLOWAY　　　2,448,426
GEAR CUTTING MACHINE
Filed Feb. 18, 1944　　　　　　　　　　8 Sheets-Sheet 3

Fig. 3

Inventor
CLARENCE T. GALLOWAY
By
B. E. Schlesinger
Attorney

Aug. 31, 1948.   C. T. GALLOWAY   2,448,426
GEAR CUTTING MACHINE
Filed Feb. 18, 1944   8 Sheets-Sheet 4

Fig. 4

Inventor
CLARENCE T. GALLOWAY
By B. E. Schlesinger
Attorney

Aug. 31, 1948.  C. T. GALLOWAY  2,448,426
GEAR CUTTING MACHINE
Filed Feb. 18, 1944  8 Sheets-Sheet 5

Fig. 5

Inventor
CLARENCE T. GALLOWAY
By  B. F. Schlesinger
Attorney

Fig. 6

Aug. 31, 1948.   C. T. GALLOWAY   2,448,426
GEAR CUTTING MACHINE
Filed Feb. 18, 1944   8 Sheets-Sheet 8

Fig. 8

Inventor
CLARENCE T. GALLOWAY
By
Attorney

Patented Aug. 31, 1948

2,448,426

UNITED STATES PATENT OFFICE 2,448,426

GEAR CUTTING MACHINE

Clarence T. Galloway, Pittsford, N. Y., assignor to Gleason Works, Rochester, N. Y., a corporation of New York Application February 18, 1944, Serial No. 522,924

3 Claims. (Cl. 90—9)

The present invention relates to machines for producing gears and in particular to machines for cutting straight toothed bevel gears by the "Revacycle" process. More specifically, the machine of the present invention is intended to be employed for cutting straight toothed bevel gears by a process such as is disclosed in the patent to Ernest Wildhaber, No. 2,315,147, issued March 30, 1943, or in the pending application of Wildhaber, Serial No. 360,437, filed October 9, 1940, now Patent No. 2,357,153, issued August 29, 1944.

In the "Revacycle" cutting process, a disc milling cutter of relatively large diameter is employed which has a plurality of roughing blades followed by a plurality of finishing blades arranged part way around its periphery with a gap between the last finishing blade and the first roughing blade. The cutter is positioned relative to the gear blank, which is to be cut, so that the cutter will cut to the full depth of the tooth spaces of the blank without any depthwise feed. Then the cutter is rotated in engagement with the blank while a relative lengthwise back and forth feed movement across the face of the blank is effected between cutter and blank. The roughing blades of the cutter rough-cut a tooth space of the blank on each of the forward feed strokes and the finishing blades of the cutter finish-cut that tooth space on the return feed stroke. The blank is held stationary during cutting and is indexed at the end of each return stroke when the gap in the cutter is abreast of the blank. Thus, during a revolution of the cutter, a tooth space of the blank is successively rough-cut and finish-cut and the blank is indexed. The blades of the cutter are so shaped that in the cutting process tooth spaces will be cut which taper properly in width and in height and which are of proper profile shape from end to end as is required in a bevel gear.

The "Revacycle" process is very fast, but the strains exerted on the gear-cutting machine in the cutting operation are quite great because of the relatively large amount of stock that has to be removed from the work in the comparatively short time of a single revolution of a cutter. Unless the machine is very rigid therefore, the cutting thrusts are apt to set up vibrations in the machine which may deleteriously affect the finish of the work being cut. This is particularly the case because the "Revacycle" cutter is a milling cutter and, like any milling cutter, takes an intermittent cut; for as each blade of the cutter strikes the blank, the cutter tends to back up under the impact, and thus there is a tendency for chatter, which adversely affects the finish of the tooth surface and the life of the cutter itself.

One object of the present invention is to provide a machine for cutting gears in a milling process, such as the "Revacycle" process, which will be of extremely rigid construction and free from vibration in use.

A further object of the invention is to provide a gear-cutting machine having means for eliminating chatter of the cutter, thereby to improve the quality of the work produced and to prolong the life of the cutter.

Another object of the invention is to provide a machine on which better gears can be cut than heretofore have been produced by the "Revacycle" process or by any milling process and in which a greater number of gears may be cut per sharpening of the cutter than has heretofore been possible.

Still another object of the invention is to provide a machine which will be extremely compact, in which the gearing between the operating parts is reduced to a minimum, and in which telescoping shafts are eliminated so far as possible, thereby to secure the greatest possible rigidity and avoid vibration.

Other objects of the invention will be apparent hereinafter from the specification and from the recital of the appended claims.

A machine built according to a preferred embodiment of the invention is shown in the accompanying drawings, in which.

In the machine illustrated in the drawings, the feed movement back and forth across the face of the gear blank is imparted to the cutter. For this purpose the cutter spindle is journaled in a carriage that is reciprocated by the feed cam. The feed cam is also journaled in the carriage and the motor which drives both the cutter spindle and the feed cam is likewise mounted on this carriage. The cam engages rollers that are mounted on the frame of the machine. Hence, as the feed cam revolves, the required back and forth feed movement is imparted to the carriage. There is a pump also mounted on the carriage. This pump is driven from the cutter spindle. It pumps oil out of a sump in the machine and back into the sump at a rate determined by the setting of a relief valve. Adjustment of this valve permits of applying a load to the cutter spindle, to take up back-lash in the train of gearing which drives the cutter, and to prevent any tendency of the spindle to back up as the successive blades of the cutter engage the work. The work is mounted on a work spindle that is journaled in the work head of the machine. The work head is mounted on a sliding base for angular adjustment and for rectilinear adjustment in two directions at right angles to one another. These adjustments are customary in bevel gear cutting machines of the type described and are provided to insure that gears of proper cone distance, pitch cone angle, and offset may be cut. The sliding base is movable manually to bring the work to and from cutting position. The indexing mechanism of the machine is of conventional type and is driven from the cutter end of the machine by an overhead drive. It operates to index the work once per revolution of the cutter when the gap in the cutter is abreast of the work.

Referring now to the drawings by numerals of reference, 10 denotes the bed or frame of the machine. This bed or frame is provided on its upper face with two pairs of spaced ways which extend at right angles to each other and which are denoted at 11 and 12, respectively. The cutter carriage 14 is mounted to slide on the ways 11. The sliding base 112, which carries the work, is mounted to slide on the ways 12.

Figure 1:
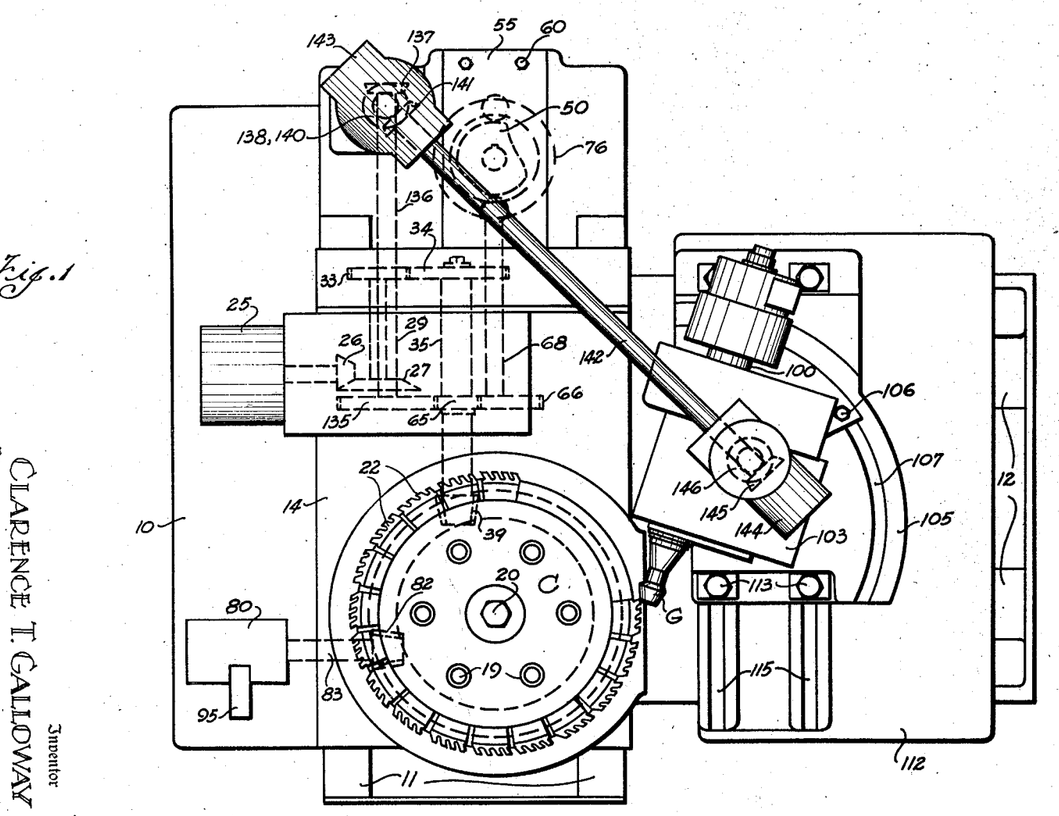
Fig. 1 is a plan view of this machine.
Figure 2:
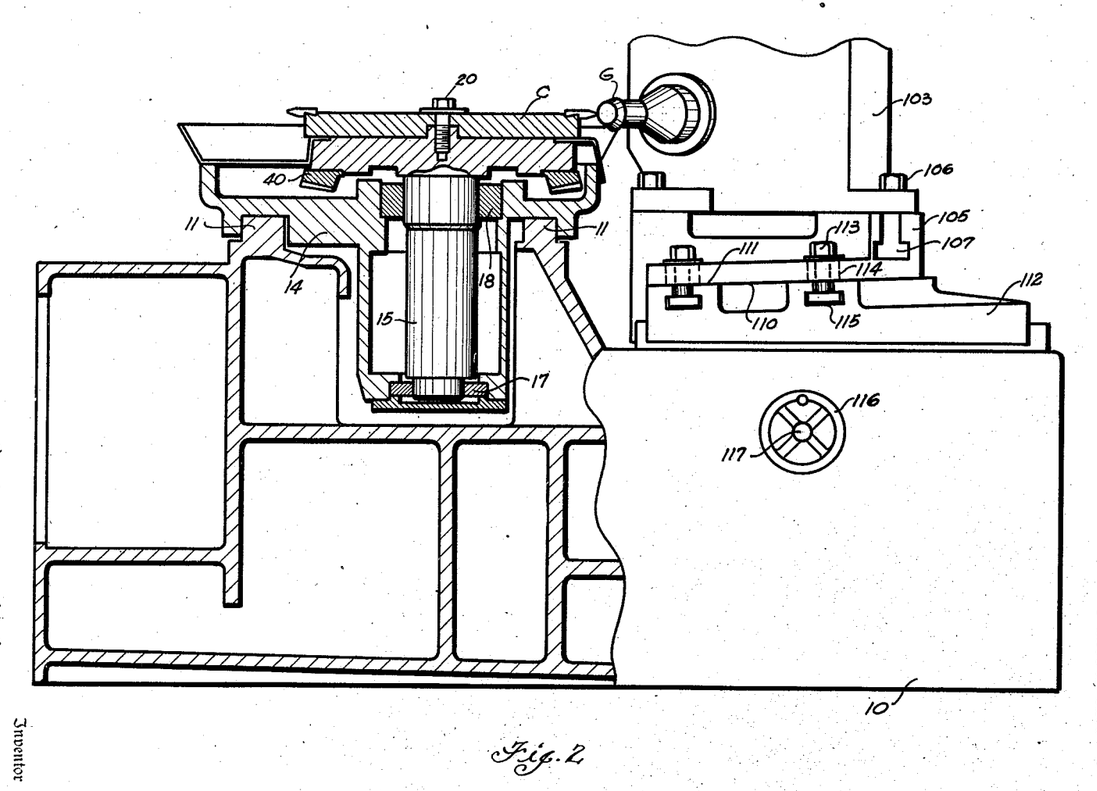
Fig. 2 is a fragmentary side elevation with parts broken away and shown in section.
Figure 3:
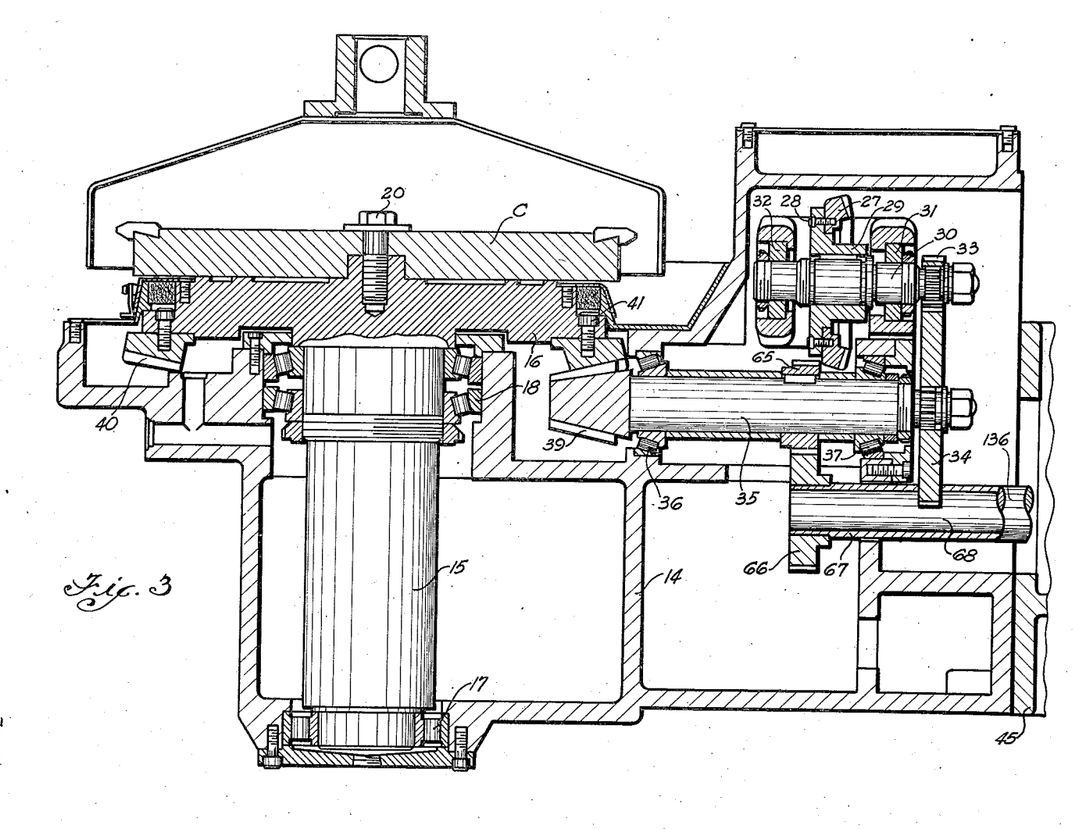
Fig. 3 is a longitudinal sectional view through a part of the cutter carriage on a somewhat larger scale and taken at right angles to view of Fig. 2.

Journaled in the cutter carriage on anti-friction bearings 17 and 18 is the cutter spindle 15 (Figs. 2 and 3). The cutter C, which is to be used on the machine, is secured to the enlarged head 16 of this spindle by bolts 19 (Fig. 1) and 20 (Figs. 1, 2, and 3).

The cutter is constructed according to the principles of the Wildhaber patent and application above mentioned. It has a plurality of cutting segments 22 which are secured to its upper face in any suitable manner and which extend part-way only around its periphery. Each segment has four cutting blades. Some of the blades of the cutter are roughing blades and some are finishing blades. The roughing blades precede the finishing blades in the direction of rotation of the cutter. There is a gap between the last and the first blades as clearly shown in Fig. 1. This gap is of sufficient angular extent to permit of indexing the gear, which is to be cut, when the gap is abreast of the gear, without withdrawal of the gear from the cutter.

The cutter is adapted to be driven by a motor 25 (Figs. 1 and 8) which is mounted on the cutter carriage 14. The armature shaft of the motor is coupled to a bevel pinion 26 which meshes with a bevel gear 27. The bevel gear 27 is secured by screws 28 (Fig. 3) to a sleeve 29 which is keyed to a shaft 30 that is journaled on anti-friction bearings 31 and 32 in the slide 14. The shaft 30 has a splined connection with a spur pinion 33 which meshes with a spur gear 34 that has a splined connection with a shaft 35. The shaft 35 is journaled on anti-friction bearings 36 and 37 in the slide 14. There is a hyphoid pinion 39 integral with the shaft 35, and this pinion meshes with a hyphoid gear 40, which is secured to the head 16 of the cutter spindle 15 by screws 41.

Figure 4:
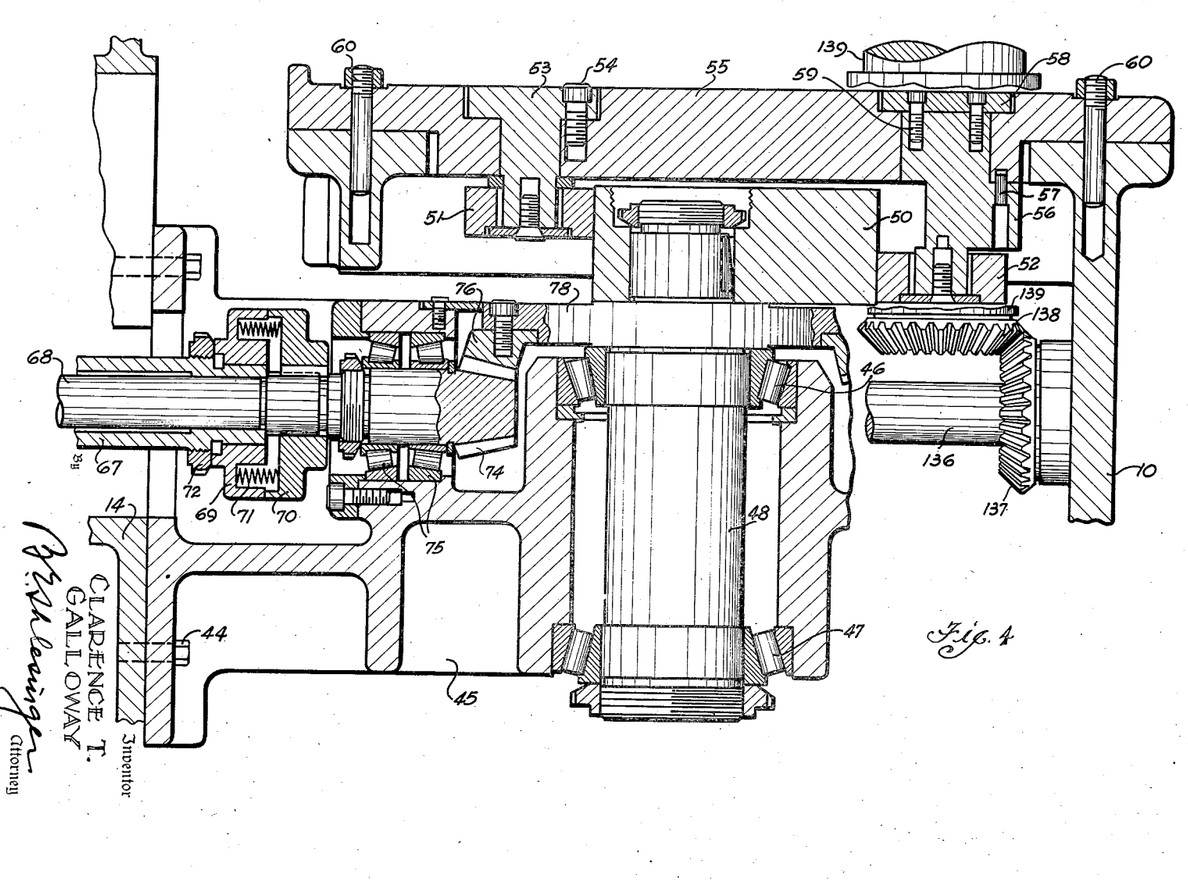
Fig. 4 is a longitudinal sectional view, which is an extension of the view of Fig. 3 and showing the rest of the cutter carriage and the means for producing lengthwise feed motion of the carriage.

Bolted to the cutter carriage 14 to slide with the cutter carriage on the frame 10 is a bracket 45 (Fig. 4). Bolts 44 serve to secure carriage and bracket together. Journaled on anti-friction bearings 46 and 47 in this bracket 45 is a shaft 48. The feed cam 50 is keyed to the upper end of this shaft 48. This cam engages at diametrically opposite points with two rollers 51 and 52. The roller 51 is rotatably mounted on a stud 53 that is secured by screw 54 to a plate 55. The roller 52 is rotatably mounted on a stud 56 that is secured to the plate 55 by a dowel-pin 57 and a clamping disc 58. The clamping disc 58 engages in a recess in the plate 55 and is secured to the stud 56 by screws 59. The plate 55 is secured to the bed or frame 10 by pins 60.

The cam 50 is driven in time with the cutter spindle 15 so that there is one reciprocation of the carriage 14 per revolution of the cutter spindle. The drive to the cam 50 is from the shaft 35 (Figs. 1, 3, and 8) through a spur pinion 65 which is keyed to this shaft 35. This pinion meshes with a spur gear 66 which is fastened to a sleeve 67. There is a shaft 68 mounted in this sleeve. This shaft is adjustably connected to the sleeve 67 by means of a standard face clutch, one member 69 (Fig. 4) of which is secured to the sleeve 67 and the other member 70 of which is keyed to the shaft 68. The member 70 seats against a shoulder formed on the shaft 68, while the member 69 is held in engagement with the member 70 against the resistance of coil springs 71 by tightening up on the nut 72 which threads onto the sleeve 67. The shaft 68 has a bevel pinion 74 formed integral with it and it is journaled at its inner end in anti-friction bearings 75 carried by bracket 45. The bevel pinion 74 meshes with a bevel gear 76 which is secured to the enlarged flange portion 78 of the shaft 48. The clutch 69—70 permits of adjusting the angular position of the cam 50 with reference to the angular position of the cutter spindle 15 so as to correlate precisely the gap in the cutter to the cam and secure the desired timing between cutter rotation and cutter reciprocation.

Figure 5:
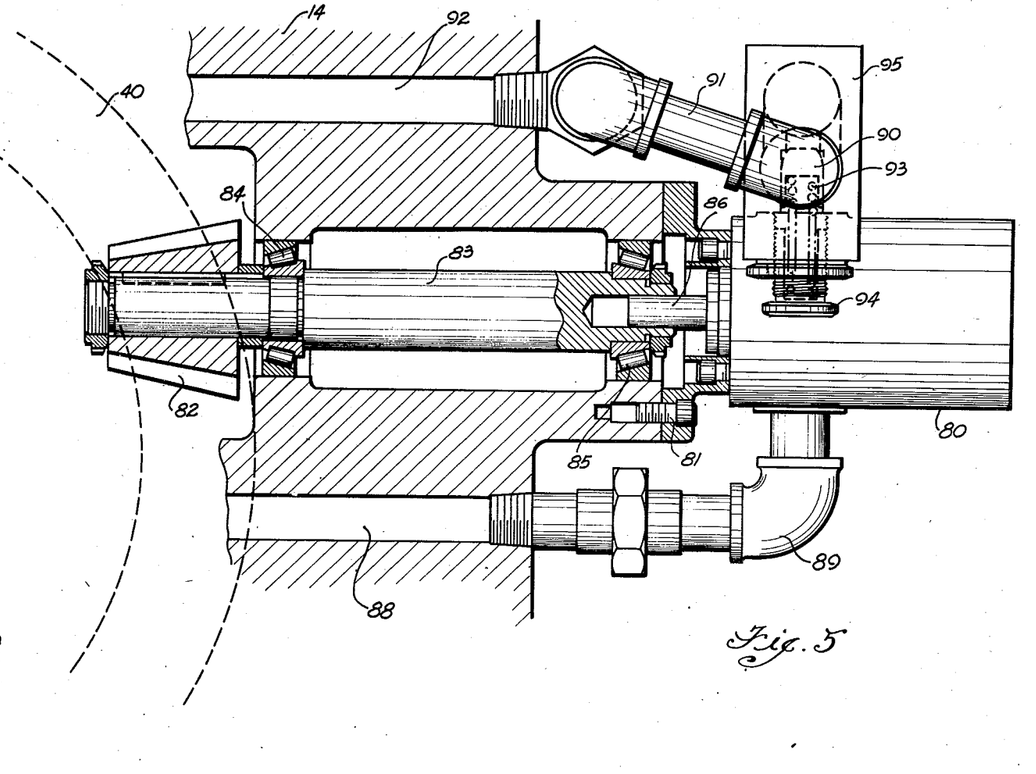
Fig. 5 is a fragmentary sectional view on an enlarged scale showing the fluid pump for applying a load to the cutter to eliminate cutter chatter and the drive to this pump.

There is a pump 80 (Figs. 1, 5, and 8) mounted on the carriage 14 and secured thereto by screws 81. This pump may be of any suitable construction. It is driven from the cutter spindle through the hypoid gear 40 and a hypoid pinion 82 which meshes with the gear 40 and which is keyed to a shaft 83. The shaft 83 is journaled on anti-friction bearings 84 and 85 in the carriage 14 and is coupled in any suitable manner to the shaft 86 of the pump. The pump is connected on one side with the sump of the machine through a suction line 88 and piping 89, and is connected on its opposite side to the sump through an adjustable relief valve 90, piping 91, and an exhaust duct 92. The relief valve can be of any standard construction and is constantly urged into closed position by a coil spring 93. The tension of this spring may be adjusted by the nut 94 which threads into the valve casing 95. As the pump rotates, it sucks oil out of the sump and pumps it back into the sump again against the resistance of the relief valve. A back pressure is therefore set up through the pump, shaft 83, and pinion 82, resisting the rotation of the hypoid gear 40 and the cutter spindle 15. By suitably adjusting the opening of the relief valve, therefore, a load can be applied to the cutter spindle 15 which tends to drive the spindle in a direction opposite to that in which it is driven by the pinion 39. Thus, back-lash may be taken out of the train of gearing driving the cutter spindle, and the cutter rotation may be controlled so that, as the successive blades of the cutter engage the blank, the cutter will not back up, but will be held against the cut to take a smooth cut. Thus, vibration and chatter will be avoided, and thus, also, the life of the cutter itself will be prolonged. It has been found in practice that through use of the pump and relief valve, the life of the cutter between sharpenings can be more than doubled.

The gear or pinion G (Figs. 1 and 2), which is to be cut, is secured in any suitable manner to the work spindle 100 (Figs. 6 and 8) of the machine. The work spindle is journaled on anti-friction bearings 101 and 102 in the work head 103. The work head 103 is mounted for angular adjustment on a plate 105 (Figs. 1 and 2) about an axis at right angles to and intersecting the axis of the work spindle. The work head is secured in any adjusted position on the plate 105 by T-bolts 106 which engage in arcuate T-slots 107 that are concentric with the axis about which the work head adjusts. This adjustment is the usual adjustment found in bevel gear cutting machines and is for the purpose of adjusting the gear to be cut to its root angle.

The plate 105 has a bottom surface 110 which is inclined to the horizontal and which seats on the complementarily inclined top surface 111 of sliding base 112. The plate 105 is adjustable upon the sliding base rectilinearly in two directions at right angles to one another. It is adjustable toward and from the cutter in the direction of the ways 12 and laterally at right angles to the ways 12. The adjustment toward and from the cutter serves to raise or lower the work through sliding of the inclined surface 110 of the plate 105 on the inclined surface 111 of the sliding base 112. The lateral adjustment serves with the adjustment of the sliding base 112 on the ways 12 to position the work in accordance with the cone distance and the tooth depth of the gear to be cut. The plate 105 is secured in any adjusted position on the sliding base 112 by means of T-bolts 113 which pass through slots 114 in the plate 105 and which engage in T-slots 115 formed in the upper surface of the sliding base 112. The sliding base 112 can be adjusted on the bed 10 through rotation of the hand wheel 116 (Fig. 2) which is secured to a shaft 117 that carries a spur pinion (not shown) which meshes with a rack (not shown) that is secured to the sliding base.

As already stated, the work is stationary during cutting and is indexed when the gap in the cutter is abreast of the work. The indexing mechanism may be of any usual or suitable type. The indexing mechanism shown is a Geneva wheel index mechanism of the general type shown in the Carlsen Patent No. 2,188,996, issued February 6, 1940.

There is a notched plate 120 (Figs. 6 and 8) keyed to the work spindle 100 and to this plate there is secured by means of screws 121 a Geneva wheel 122. The index plate 120 and the Geneva wheel 122 each have preferably the same number of notches as there are tooth spaces in the gear to be cut.

Figure 6:
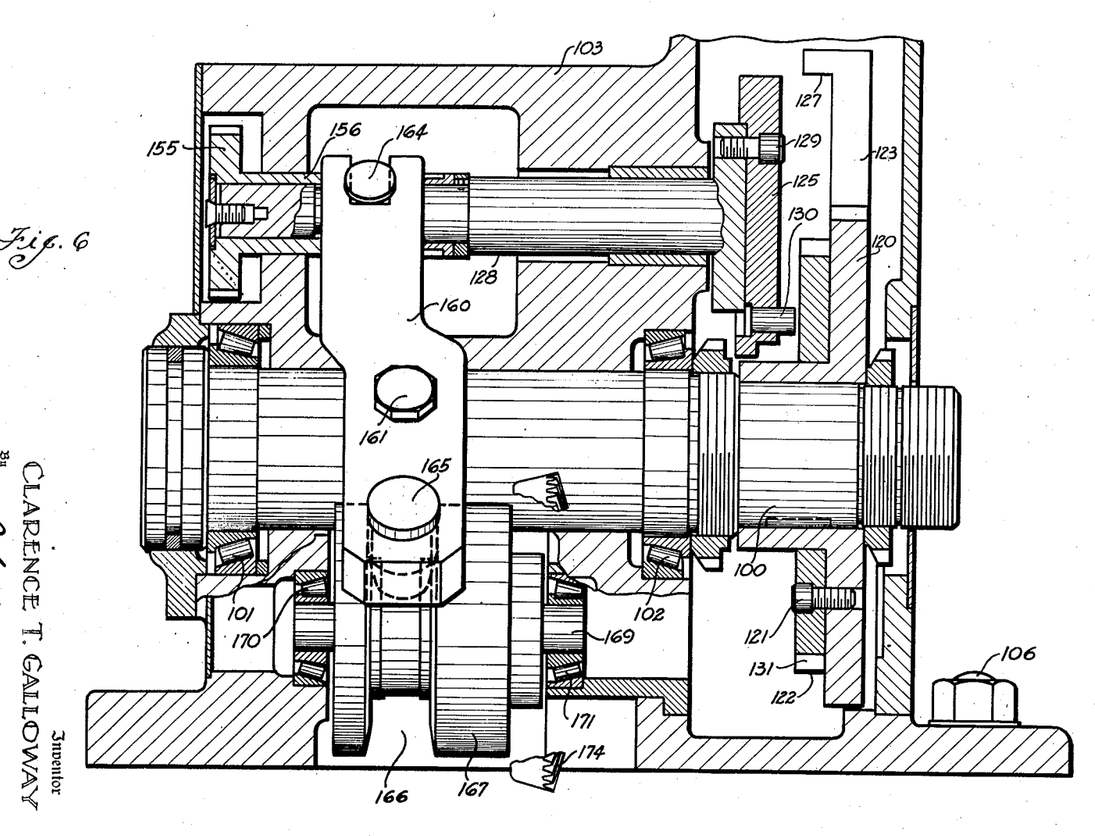
Fig. 6 is a fragmentary sectional view of the work head taken longitudinally thereof and in a vertical plane.
Figure 8:
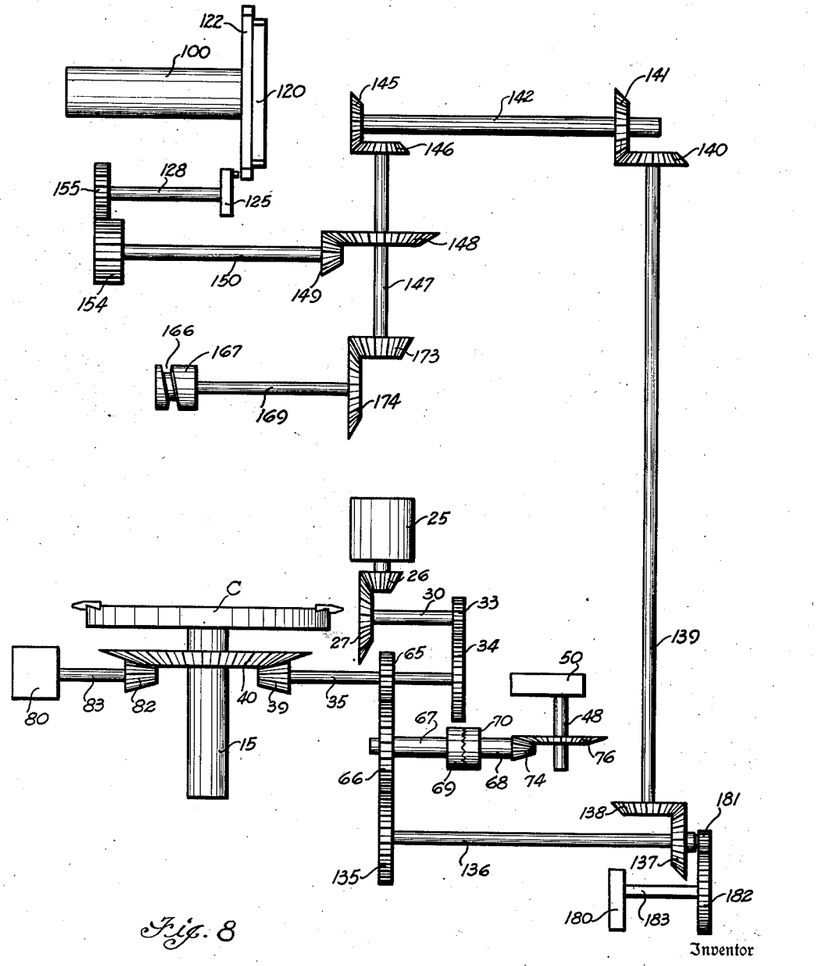
Fig. 8 is a diagrammatic view of the train of gearing for driving the various operating parts of the machine.

Index plate 120 and work spindle 100 are adapted to be held against rotation during the cutting of a tooth space of the gear by a locking dog 123. This locking dog is normally held in engagement with a notch of the index plate 120 by a spring (not shown). It is adapted to be disengaged from the index plate, to permit indexing of the work spindle, by a cam 125 which is adapted to engage a projection 127 formed on the locking dog. The cam 125 is secured to a shaft 128 by screws 129. It carries a pin 130 which is adapted to be engaged with slots 131 of the Geneva wheel 122 to rotate the Geneva wheel and index the work spindle.

The shaft 128 is mounted for rotational and axial sliding movement in the work head 103. It is adapted to be driven rotatably from the gear 66 (Figs. 1, 3, and 8). This gear meshes not only with the gear 65 but with a spur gear 135 which is secured to a shaft 136. This shaft 136 is journaled in the cutter carriage 14 and in the base 10 of the machine in parallelism with the shaft 68. At its outer end it carries a bevel gear 137 which meshes with the bevel gear 138 that is secured to the lower end of a vertical shaft 139 (Figs. 4 and 8). The shaft 139 carries at its upper end a bevel gear 140 which meshes with a bevel gear 141 that has a sliding spline connection with one end of a shaft 142.

Figure 7:
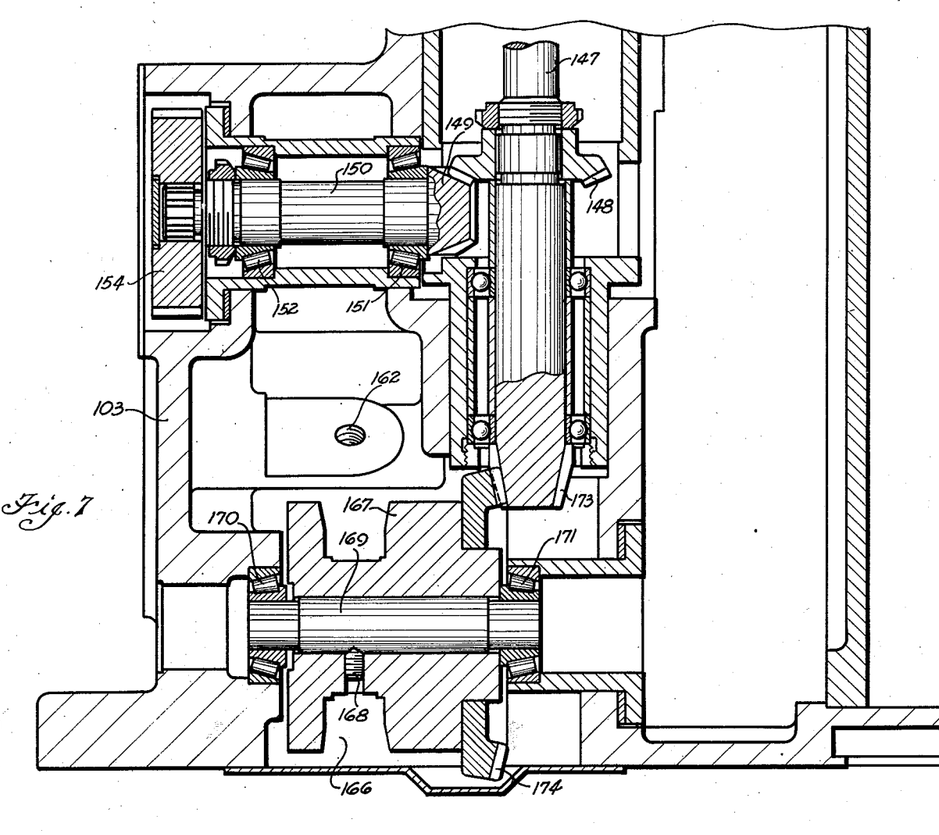
Fig. 7 is a sectional view through the work head in a plane parallel to the plane of Fig. 6.

The gear 141 is journaled in a bracket 143 which is secured to the bed 10, while the shaft 142 is journaled at the end, opposite its connection with gear 141, in a bracket 144 that is secured to the work head 103. To the latter end of the shaft 142 there is secured a bevel gear 145 which meshes with the bevel gear 146. The bevel gear 146 is secured to the upper end of a vertical shaft 147 (Figs. 7 and 8). Keyed to this shaft 147 is a bevel gear 148 which meshes with a bevel pinion 149. This pinion is integral with a shaft 150 which is journaled on anti-friction bearings 151 and 152 in the work head 103. There is a long-faced spur gear 154 mounted on the shaft 150 and having a splined connection therewith. This spur gear meshes with a spur gear 155 (Figs. 6 and 8) which is integral with a sleeve 156 that is keyed to the shaft 128. Through the drive described, it will be seen that the cam 125 is rotated in time with the rotation of the cutter spindle 15 and the feed cam 50.

The shaft 128 is periodically shifted axially to move the cam 125 into and out of engagement with the lug portion 127 of locking-dog 123. In engaging position, the cam 125 serves to disengage the lock 123 from the index plate 120 and to engage the driving pin 130 with the Geneva wheel 122 to index the work spindle. The shifting movement of the shaft 128 is effected by rocking the lever 160. This lever is pivotally mounted intermediate of its ends on a stud 161 (Fig. 6) which threads into a hole 162 (Fig. 7) in the work head 103. At one end, the lever 160 is bifurcated to form a yoke which engages with pins 164 which extend at diametrically opposite points from the sleeve 156. At its opposite end, the lever 160 carries a roller 165 which engages in the track 166 of a cam 167 (Figs. 6, 7, and 8). The cam 167 is secured by a set-screw 168 to a shaft 169 which is journaled on anti-friction bearings 170 and 171 in the work-head 103. The cam 167 is rotated continuously, being driven from the vertical shaft 147 through a bevel pinion 173 which is integral with that shaft at the lower end thereof and which meshes with a bevel gear 174 that is fastened in any suitable manner to the cam 167.

The operation of the machine will be understood from the preceding description but may be briefly summed up here. Assuming that the operator has adjusted the work into the correct relation to the cutter by adjustment of the sliding base 112 on the bed or frame 12, by adjustment of the plate 105 on the sliding base 112 and by adjustment of the work head 103 on the plate 105, the operator starts the drive motor 25. This causes the cutter to be revolved through the gearing 26, 27, 33, 34, 39, and 40 (Figs. 1, 3, and 8), and it causes the cutter C to be moved simultaneously back and forth across the face of the gear blank G through reciprocation of the carriage 14 by operation of the cam 50 which is driven in time with the rotation of the cutter spindle through the gearing 65, 66, 74, and 76 (Figs. 1, 3, 4, and 8). The cutter roughs out a tooth space of the blank on the forward stroke of the carriage 14 and finishes that tooth space on the return stroke. Then the gap in the cutter comes abreast of the blank. Then the blank is indexed. The indexing is effected by movement of the cam 125 (Figs. 6 and 8) rearwardly in the work-head to cause the cam to disengage the lock-dog 123 from the index plate 120 and to cause the pin 130 to engage the Geneva wheel 122. The cam 125 is shifted by operation of the cam 167 and lever 160 (Fig. 6), the cam 167 being driven from the shaft 67 (Figs. 3 and 8) through the gearing 66, 135, 137 (Figs. 1, 4, and 8), 138, 140, 141, 145, 146, 173, and 174 (Figs. 7 and 8), and the rotation of the cam 125 being imparted to the work spindle, when the pin 130 is engaged with the Geneva wheel 122, the cam 125 being rotated continuously from the shaft 147 (Figs. 7 and 8) through the gearing 148, 149, 154, and 155 (Figs. 6 and 8). As soon as the work has been indexed, the cam 125 is moved forwardly again to withdraw the pin 130 from the Geneva wheel 122 and allow the index dog 123 to lock up the index plate again. The cutter then moves forward again through movement of the carriage 14 to cut a new tooth space of the blank. When the blank has been indexed through one revolution, the gear is complete. During the whole of the cutting operation, the cutter is held against the cut by operation of the pump 80 and relief valve 99, the pump being driven from the cutter spindle drive gear 40 through the hypoid pinion 82.

While the invention has been described in connection with the machine for cutting gears according to the "Revacycle" process, it will be understood that the invention is not limited to a machine for this use, but may be applied to various types of gear milling machines. Thus it may be used on machines for rough-cutting bevel gears with either a "Revex" type of cutter or a standard milling cutter. In fact, the mechanism for eliminating chatter may be applied to milling machines of all types even to machines employing face milling cutters.

In general it may be said that while the invention has been described in connection with a particular embodiment thereof, it is capable of further modification, and this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for producing gears, a frame, a work support mounted on the frame, a carriage reciprocable rectilinearly on the frame, a disc-type rotary gear cutter journaled in said carriage and having cutting blades arranged partway around its periphery and having an indexing gap between the blades, a cam journaled in said carriage for rotation about an axis offset from but parallel to the axis of the cutter, a follower mounted on the frame and engaging said cam, said cam having a peripheral cam surface and being adapted to reciprocate the carriage on rotation of the cam to move the cutter back and forth across the face of the work on each revolution of the cam, a motor mounted on the carriage, gearing driven by said motor for rotating said cutter, and gearing driven by said motor for rotating the cam in timed relation with the cutter so that the carriage makes a reciprocation per revolution of the cutter.

2. In a machine for producing gears, a frame, a carriage reciprocable on the frame, a tool spindle journaled in the carriage, a disc-type rotary cutter secured to said tool spindle to rotate therewith, said cutter having cutting blades arranged part way only around its periphery with a gap between the last and first blades, a cam journaled in said carriage to rotate about an axis parallel to but offset from the axis of the tool spindle, a follower mounted on the frame and engaging said cam, said cam having a peripheral surface so shaped as to impart a reciprocation to the carriage on each revolution of the cam, a motor mounted on the carriage, gearing driven by said motor for rotating the cutter spindle, gearing driven by said motor for rotating the cam in timed relation to the rotation of the cutter spindle so that the cam makes one revolution per revolution of the cutter spindle, a work head mounted on the frame for angular adjustment thereon so as to position the work relative to the cutter in accordance with the cone angle of the gear to be cut, a work spindle journaled in the frame with its axis at right angles to the axis about which the work head is angularly adjustable, means for locking the work spindle against rotation during cutting, and means driven in time with the cutter spindle and the cam for disengaging said locking means and indexing the work spindle on each revolution of the cutter when the gap in the cutter is abreast of the work, said means comprising a cam, gearing mounted on the frame in offset relation to the axis of adjustment of the work head and driven in time with the rotation of the tool spindle, a shaft driven by said gearing, and gearing driven by said shaft mounted on the work head in offset relation to the axis of adjustment of the work head and operatively connected to said last named cam.

3. In a machine for producing gears, a frame, a carriage reciprocable on the frame, a tool spindle journaled in said carriage, a rotary milling cutter secured to said tool spindle to rotate therewith, a follower secured to the frame, a cam journaled in said carriage for rotation about an axis offset from but parallel to the axis of the tool spindle, said cam engaging said follower and being shaped on rotation to reciprocate the carriage, a pump mounted on the carriage, ducts connecting the pump on opposite sides with supply and exhaust lines that lead, respectively, to and from a sump, an adjustable relief valve controlling the flow of fluid from the exhaust side of the pump, a gear on the tool spindle, a gear directly connected to the pump and meshing with said last named gear to be driven by said last named gear on rotation of the tool spindle, whereby the pump is driven on rotation of the tool spindle, a motor mounted on the carriage, gearing for driving said tool spindle from the motor, and gearing for driving the cam in time with the rotation of the tool spindle.

CLARENCE T. GALLOWAY.

REFERENCES CITED

The following references are of record in the file of this patent:

UNITED STATES PATENTS

| Number | Name | Date |
|---|---|---|
| 381,108 | Brainard | Apr. 17, 1888 |
| 896,306 | Lewis | Aug. 18, 1908 |
| 896,401 | Lewis | Aug. 18, 1908 |
| 1,492,545 | Einstein | Apr. 29, 1924 |
| 1,616,257 | Gleason | Feb. 1, 1927 |
| 1,786,689 | White | Dec. 30, 1930 |
| 2,024,747 | Samek | Dec. 17, 1935 |
| 2,032,589 | Overstedt | Mar. 3, 1936 |
| 2,111,045 | Drummond | Mar. 15, 1938 |
| 2,120,386 | Baash et al. | June 14, 1938 |
| 2,267,696 | Groene et al. | Dec. 23, 1941 |
| 2,288,058 | Wildhaber et al. | June 30, 1942 |
| 2,294,014 | Wildhaber | Aug. 25, 1942 |
| 2,393,727 | Aber | Jan. 29, 1946 |